United States Patent [19]

Aguiléra et al.

[11] Patent Number: 4,606,844

[45] Date of Patent: Aug. 19, 1986

[54] FLUOROCHLOROHYDROCARBON/PHOSPHORIC ACID ESTER/CARBOXYLIC ACID DRYING COMPOSITIONS

[75] Inventors: Roland Aguiléra, Saint-Remy-les-Chevreuse; Jean-Pierre Rémond, Massy-Villaine, both of France

[73] Assignee: Chloe Chimie, Puteaux, France

[21] Appl. No.: 693,164

[22] Filed: Jan. 22, 1985

Related U.S. Application Data

[63] Continuation of Ser. No. 498,291, May 26, 1983, abandoned.

[30] Foreign Application Priority Data

May 27, 1982 [FR] France .................. 82 09213

[51] Int. Cl.$^4$ .................. C09K 3/00; C23G 5/02; C07F 9/09; C11D 10/02
[52] U.S. Cl. .................. 252/194; 252/153; 252/162; 252/171; 252/174.16; 252/364; 252/546
[58] Field of Search .................. 252/194, 162, 364

[56] References Cited

U.S. PATENT DOCUMENTS

| | | | |
|---|---|---|---|
| 4,161,450 | 7/1979 | Vitat et al. | 252/194 |
| 4,191,666 | 3/1980 | Chabert et al. | 252/545 |
| 4,383,932 | 5/1983 | Hisamoto et al. | 252/194 |

FOREIGN PATENT DOCUMENTS

| | | |
|---|---|---|
| 872752 | 6/1971 | Canada . |
| 2040733 | 1/1971 | France . |
| 1286334 | 8/1972 | United Kingdom . |
| 1492780 | 11/1977 | United Kingdom . |

*Primary Examiner*—A. Lionel Clingman
*Attorney, Agent, or Firm*—Burns, Doane, Swecker & Mathis

[57] ABSTRACT

Surface treating compositions, e.g., for the removal of water therefrom, are comprised of (1) a solvent comprising at least 50% by weight of 1,1,2-trichloro-1,2,2-trifluoroethane and (2) a water-solubilizing additive therefor, said additive (2) comprising (i) at least one phosphoric acid ester of the general formula:

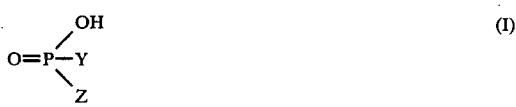

in which Y is a radical of the formula —O—T—OC$_m$H$_{2m}$)$_r$OH, and Z is a radical Y or a hydroxyl group, (ii) at least one ester of the above formula (I), in which at least one phosphoric acid moiety has been neutralized with at least one amine salt of the general formula:

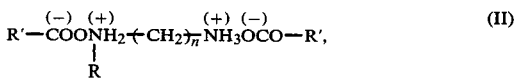

and (iii) at least one carboxylic acid of the general formula:

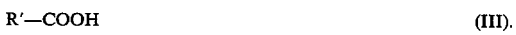

15 Claims, No Drawings

FLUOROCHLOROHYDROCARBON/PHOSPHORIC ACID ESTER/CARBOXYLIC ACID DRYING COMPOSITIONS

This application is a continuation of application Ser. No. 498,291, filed May 26, 1983, now abandoned.

BACKGROUND OF THE INVENTION

1. Field of the Invention

The present invention relates to certain compositions of matter based on fluorochlorohydrocarbons and to various utilizations thereof, in particular for removing water from surfaces to which they have been applied.

2. Description of the Prior Art

The use of hydrocarbon solvents, and in particular of fluorochlorohydrocarbons, for cleaning articles of various kinds has resulted in an abundance of literature.

By way of illustration, there may be mentioned, in particular, French Pat. Nos. 1,307,430, 1,566,900, 2,040,733, 2,014,018, 2,030,662, 1,515,393, 2,297,668, 2,281,778 and 2,353,625. The various references mentioned above disclose compositions comprising, apart from the solvent, which is typically of the fluorochlorohydrocarbon type, one or more additives of the surface-active kind, it being possible for these surface-active agents to be non-ionic, anionic or cationic. French Pat. No. 1,307,430 mentions, for example, isooctylphenyl polyethylene glycol having from 2 to 12 ethylene glycol units, esters of amine salts of oleic acid, quaternized with dimethyl sulfate, and amine salts of dodecylbenzenesulfonic acid.

French Pat. No. 1,566,900 discloses the use of certain salts of sulfosuccinic acid esters.

French Pat. No. 2,040,733 proposes combining with the solvent a salt derived from a diamine and from one or more aliphatic acids.

French Pat. No. 2,014,018 proposes a composition which can be used for cleaning metal or plastic articles under cold conditions, the said composition comprising an organic hydrocarbon solvent, one or more phosphoric acid esters and, if appropriate, water.

The other references mentioned above combine phosphate esters with non-ionic surface-active agents of the hydroxylated polyoxyalkylene type (French Pat. No. 2,030,662), an alkyl phosphate with a sufficient amount of an amine to neutralize the phosphate ester almost completely (French Pat. No. 1,515,393), an amine salt with an organic acid (French Pat. No. 2,353,625), or a salt formed by an acid phosphate and a saturated aliphatic amine and a partially oleated diamine, quaternized with dimethyl sulfate (French Pat. No. 2,281,778), or propose an emulsion comprising the solvent, water and a surface-active agent resulting from the combination, in the form of salts, of a monophosphoric or diphosphoric acid ester with a pair of amines of which one of the chain ends has a hydrophilic character and the other either possesses a lipophilic character or provides salts of lipophilic character with the phosphoric acid esters (French Pat. No. 2,297,668).

SUMMARY OF THE INVENTION

Accordingly, a major object of the present invention is the provision of an improved composition of matter having exceptional efficiency as regards the removal of water by solubilization thereof in the subject composition.

Briefly, the present invention features a homogeneous liquid composition of matter which comprises up to 99.95% by weight of a solvent containing at least 50% by weight of 1,1,2-trichloro-1,2,2-trifluoroethane, and is characterized in that it also contains:

(i) at least one phosphoric acid ester of the formula:

in which the symbol Y represents a radical of the formula $-O-T-(OC_mH_{2m})_rOH$, in which r represents an integer ranging from 2 to 30, m represents 2, 3 or 4 and the symbol T represents a saturated or unsaturated, divalent aliphatic radical, an aromatic radical or a divalent aliphatic-aromatic radical, it being possible for the aforesaid radicals to contain up to 40 carbon atoms, and the symbol Z represents a radical Y or a group OH, the symbol T and the symbol r also being such that the total number of carbon atoms in the radical Y is more than 20;

(ii) at least one ester of the formula (I) given above, in which at least one phosphoric acid group is neutralized with an amine salt of the formula:

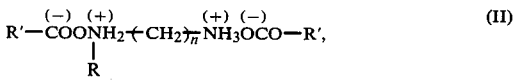

in which the symbol R represents a saturated or unsaturated, monovalent aliphatic radical containing up to 25 carbon atoms, the symbols R', which can be identical or different, represent an aliphatic radical optionally substituted by a hydroxyl group or by an acyl radical and containing from 10 to 30 carbon atoms, the said radical containing at least one ethylenic carbon-carbon double bond, and n represents an integer ranging from 1 to 9; and (iii) at least one carboxylic acid of the formula:

in which the symbol R' has the meaning given above in the context of the definition of the ester mentioned under (ii).

The invention also relates to a process for the preparation of the compositions as above outlined, the said process being characterized in that it consists in mixing with the solvent:

(1) at least one phosphoric acid ester of the formula (I); and (2) at least one amine salt of the formula (II), the said amine salt being used in an amount such that some of the phosphoric acid groups of the ester of the formula (I) are neutralized with the said amine salt, and in recovering the entirety of the reaction medium.

The intermediate compositions immediately above-described constitute another object of this invention.

DETAILED DESCRIPTION OF THE INVENTION

More particularly according to the present invention, in formulating the subject final product compositions, the individual constituents of the mixture are employed in amounts such that the ratio $$\frac{A \cdot I_{A1}}{B \cdot I_{A2}}$$

is more than 1 and preferably ranges from 1.1 to 3.5, with A denoting the weight of the phosphoric acid ester of the formula (I) B denoting the weight of the amine salt, $I_{A1}$ denoting the acid number of the phosphoric acid ester (acidity for a diester and/or first acidity for a monoester) and $I_{A2}$ denoting the acid number of the amine salt.

The acid number corresponds to the number of milligrams of potassium hydroxide per gram of phosphoric acid ester or amine salt.

The immediately foregoing reflects that, in general terms and by carrying out the process as above outlined, the amount of constituent (iii) (acid of the formula III) is circumscribed by the ratio of amine salt/phosphoric acid ester of the formula (I), the number of —COOH groups being equal to the number of phosphoric acid groups reacting with the amine salt of the formula (II).

The same ratio of amine salt/phosphoric acid ester of the formula (I) circumscribes the proportion of the acid phosphoric acid esters of the formula (I) and of the phosphoric acid esters in which at least one phosphoric acid group is neutralized. Of course, it is possible to use an amount of acid (iii) which is greater than the amount of acid released from the amine salt by the reaction of the phosphoric acid groups with the said salt. It is also possible to add another acid of the formula (III) to the acid (iii) originating from the amine salt. The excess of acid is preferably at most 10% relative to the stoichiometry corresponding to the neutralization of a portion of the phosphoric acid ester (I) by the amine salt (II).

Also as above-outlined, the solvent contains at least 50% by weight of 1,1,2-trichloro-1,2,2-trifluoroethane. The remainder to 100% can of course consist of the same solvent or of one or more saturated aliphatic chlorohydrocarbons or chlorofluorohydrocarbons containing 1 or 2 carbon atoms, such as, for example, methylene chloride.

In the formulation of the compositions according to the invention, it is possible to use a single phosphoric acid monoester or diester of the formula (I) or a mixture of several esters, it being possible for the constituents of the mixture themselves to be selected from among the monoesters or diesters of the formula (I).

The phosphoric acid esters of the formula (I), which are preferably used in amounts of 0.04 to 8% relative to the total weight of the composition, can be selected from among the various monoesters and diesters resulting from the reaction of phosphorus compounds with oxyalkyleneated linear alcohols. Among such materials, representative are, in particular, esters containing oxyethylene, oxypropylene or oxyethylene/oxypropylene groups. Especially suitable are the esters in which the oxyalkylene chain or chains contain from 3 to 25 oxyethylene units, namely, the esters of the formula (I) in which m is equal to 2 and r ranges from 3 to 25, it being possible for the radical represented by the symbol T in the said formula (I) to be, in particular, one of the divalent radicals corresponding to the following radicals: hexyl, octyl, isooctyl, 2-ethylhexyl, decyl, isodecyl, t-dodecyl, dodecyl, tridecyl, tetradecyl, hexadecyl, oleocetyl and nonylphenyl.

Specific examples of esters of the formula (I) which are representative are 2-ethylhexyl phosphate containing 20 units of ethylene oxide, nonylphenyl phosphate containing 6 units of ethylene oxide, nonylphenyl phosphate containing 9 units of ethylene oxide, tridecyl phosphate containing 6 units of ethylene oxide, dodecyl phosphate containing 6 units of ethylene oxide and oleocetyl phosphate containing 5 units of ethylene oxide, the various above-mentioned phosphates, which can be used in admixture, containing one or two phosphoric acid ester groups.

The second constituent of the compositions of the invention is selected from among the phosphoric acid esters of the formula (I) in which at least one phosphoric acid group is neutralized by reaction with the amine salt of the formula (II). These amine salts, which are preferably used in amounts of 0.01 to 2% relative to the total weight of the composition in the process defined above, can be obtained by reacting one or more carboxylic acids of the formula R'—COOH (III) with a diamine of the formula R.NH(CH$_2$)$_n$NH$_2$ (IV), in which formulae the symbols R, R' and n have the meanings given above.

Exemplary of the acids of the formula (III), which also form the constituent (iii) of the compositions according to the invention, particularly representative are undecylenic, dodecylenic, tetradecylenic, hexadecylenic, oleic, linoleic, linolenic, ricinoleic and acetylricinoleic acids. It is quite obviously possible to use a mixture of at least two of these acids.

By way of illustration of the diamines of the formula (IV), particularly representative are caprylaminopropyleneamine, laurylaminopropyleneamine, myristylaminopropyleneamine, palmitylaminopropyleneamine, stearylaminopropyleneamine and oleylaminopropyleneamine. Of course, it is also possible to use a mixture of at least two of these amines.

By way of illustration of the amine salts of the formula (II), particularly representative are oleylaminopropyleneamine dioleate, oleylaminopropyleneamine diundecylenate, stearylaminopropyleneamine dioleate, palmitylaminopropyleneamine dioleate and oleylaminopropyleneamine dilinoleate. Of course, it again is possible to use a mixture of at least two of these salts.

It will be appreciated that, in the foregoing, the substituent of an amine group is designated by a radical corresponding to the trivial name of the acid, it being acknowledged that this radical is exclusively hydrocarbon in nature. By way of examples, the stearyl radical denotes the octadecyl radical here, the oleyl radical denotes the octadec-9-enyl radical, the palmityl radical denotes the hexadecyl radical and the myristyl radical denotes the tetradecyl radical.

The compositions used in the process according to the invention preferably contain 0.05 to 1% of the amine salt of the formula (II), 0.1 to 5% of phosphoric acid ester of the formula (I) and up to 99.85% of solvent containing at least 50% by weight of 1,1,2-trichloro-1,2,2-trifluoroethane. These compositions can be prepared simply by admixing the solvent and the additives of the formulae (I) and (II) at ambient temperature.

The customary techniques can be used to apply the compositions to the surfaces to be treated, namely, spraying, sprinkling or alternatively immersion of the surfaces in the subject compositions. The treatment can be carried out at ambient temperature, although the temperature of the composition is preferably raised to the boiling point, in particular, if the immersion technique is used.

The simultaneous use of the additives of the formulae (I) and (II) in the compositions of the invention makes it possible to achieve 100% removal of the water. The value of the said compositions therefore appears to be considerable in the very large number of cases where it is imperative to obtain total drying.

In order to further illustrate the present invention and the advantages thereof, the following specific example is given, it being understood that same is intended only as illustrative and in nowise limitative.

EXAMPLE (1) Composition:

A composition was prepared which contained, by weight:
(a) 99.45% of 1,1,2-trichloro-1,2,2-trifluoroethane;
(b) 0.4% of dodecyl hydrogenphosphate containing 6 units of ethylene oxide (mixture of monoester and diester in a molar ratio of 1.5/1); and
(c) 0.15% of oleylaminopropyleneamine dioleate.

The acid number of the phosphate (acidity of the diester and first acidity of the monoester) was 83.

The aforesaid amine salt is marketed under the trademark Cemulcat ODO by S.F.O.S. Its acid number was 125.

The composition was prepared simply by intimately admixing the aforesaid constituents at ambient temperature.

(2) Processing:

The apparatus employed consisted of a cascade of two vessels each having a volume of 14 dm$^3$. 1,1,2-Trichloro-1,2,2-trifluoroethane was introduced into the first vessel and the composition described under (1) was introduced into the second.

The contents of each vessel were heated to a boil and the vapors thereof were condensed onto a coil cooled by circulating water. The condensate produced from these vapors, consisting mainly of 1,1,2-trichloro-1,2,2-trifluoroethane and water, was collected and charged into the first vessel after passage through a water separator (Florentine receiver). The composition in the second vessel was maintained constant by introducing solvent (overflow from the first into the second vessel).

(3) Drying examples:

3.1.—A printed circuit was first degreased in an aqueous solution of detergent and then rinsed with tap water. This circuit was immersed in the second vessel for 20 seconds and then in the first vessel for 20 seconds in order to remove the entrained film of surface-active agent.

After this period, the circuit was removed from the first vessel after a brief passage through the vapor phase above the two vessels.

Over 10 experiments, it was found that 100% drying of the printed circuits was obtained.

The degree of drying was determined as follows:

The printed circuit, degreased and dried in an oven (15 minutes at 100°), was immersed in anhydrous methanol. The water in this methanol was determined. The same circuit was immersed first in water and then for 3 minutes in the composition described in paragraph (1). The circuit was rinsed by immersion in 1,1,2-trichloro-1,2,2-trifluoroethane by itself, and then dipped in anhydrous methanol. The water in the methanol was determined again by the Karl Fischer method. Comparison between the two operations for determination of the water makes it possible to determine the degree of drying.

3.2.—The experiment described under 3.1 was repeated, under identical conditions, on the following items:
(i) optical glass;
(ii) fine-mesh steel grid;
(iii) integrated-circuit support with a silvered surface;
(iv) bearing balls;
(v) metal-coated plastic stoppers; and
(vi) nickel record-pressing matrix.

10 experiments were carried out on each sample.

100% drying was obtained in all of the experiments.

3.3.—A total amount of 28 liters of tap water was introduced into the second vessel of the apparatus described in paragraph (2), by successively adding 1 liter amounts. This water contained 0.3% by weight of solids essentially consisting of mineral salts. The water introduced in this manner was removed by azeotropic distillation and evacuated from the apparatus by means of the separator located on the return path of the condensate to the first vessel. The drying test described under 3.1. was carried out on all of the items mentioned under 3.2. and 100% drying was observed in all cases, including the case where the water content of the drying composition reached a value of 5%. It is interesting to note that the presence of a large amount of mineral salts does not have any detectable influence on the emulsifying power of the additives employed in the invention.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A homogeneous composition of matter which comprises (1) up to 99.95% by weight of a solvent comprising at least 50% by weight of 1,1,2-trichloro-1,2,2-trifluoroethane and up to 50% by weight of one or more saturated aliphatic chlorohydrocarbons or chlorofluorohydrocarbons containing 1 or 2 carbon atoms and (2) a water-solubilizing additive therefor, said additive (2) comprising (i) at least one phosphoric acid ester of the general formula:

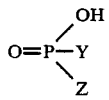
 (I)

in which Y is a radical of the formula —O—T$\pm$OC$_m$H$_{2m}\rangle_r$OH, wherein r is an integer ranging from 2 to 30, m is 2, 3 or 4, and T is a saturated or unsaturated, divalent aliphatic radical, a monocyclic aromatic radical, or an aliphatic-aromatic radical, with each such radical containing up to 40 carbon atoms, and Z is a radical Y or a hydroxyl group, with the proviso that T and r are such that the total number of carbon atoms in the radical Y is more than 20, (ii) at least one ester of the above formula (I), in which at least one amine salt of the general formula:

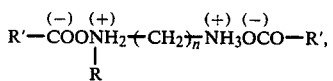
 (II)

in which R is a saturated or unsaturated, monovalent aliphatic radical containing up to 25 carbon atoms, the symbols R', which can be identical or different, are each an aliphatic radical, an hydroxyl substituted aliphatic radical, or an acyl radical, with each radical containing from 10 to 30 carbon atoms and comprising at least one ethylenic carbon-carbon double bond, and n is an integer ranging from 1 to 9, and (iii) at least one carboxylic acid of the general formula:

R'—COOH   (III)

in which R' is as defined above.

2. The composition of matter as defined by claim 1 comprising from 0.04 to 8% by weight of the at least one phosphoric acid ester (I).

3. The composition of matter as defined by claim 2, said at least one phosphoric acid ester (I) comprising reaction product of a phosphorus compound with oxyalkyleneated linear alcohol.

4. The composition of matter as defined by claim 3, said at least one phosphoric acid ester (I) comprising oxyethylene, oxypropylene or oxyethylene/oxypropylene groups.

5. The composition of matter as defined by claim 4, said at least one phosphoric acid ester (I) comprising from 3 to 25 oxyethylene recurring units.

6. The composition of matter as defined by claim 3, wherein said at least one phosphoric acid ester (I), T corresponds to one of the divalent radicals corresponding to the following radicals: hexyl, octyl, isooctyl, 2-ethylhexyl, decyl, isodecyl, t-dodecyl, dodecyl, tridecyl, tetradecyl, hexadecyl, oleocetyl or nonyl phenyl.

7. The composition of matter as defined by claim 3, said at least one phosphoric acid ester (I) comprising one or more of the monoesters or diesters, 2-ethylhexyl phosphate containing 20 units of ethylene oxide, nonylphenyl phosphate containing 6 units of ethylene oxide, nonylphenyl phosphate containing 9 units of ethylene oxide, tridecyl phosphate containing 6 units of ethylene oxide, dodecyl phosphate containing 6 units of ethylene oxide or oleocetyl phosphate containing 5 units of ethylene oxide.

8. The composition of matter as defined by claim 2, wherein said at least one ester (ii), the at least one phosphoric acid moiety having been neutralized with from 0.01 to 2% by weight of the amine salt (II).

9. The composition of matter as defined by claim 8, said amine salt (II) comprising oleylaminopropyleneamine dioleate, oleylaminopropyleneamine diundecylenate, stearylaminopropyleneamine dioleate, palmitylaminopropyleneamine dioleate or oleylaminopropyleneamine dilinoleate.

10. The composition of matter as defined by claim 9, said at least one carboxylic acid (III) comprising undecylenic, dodecylenic, tetradecylenic, hexadecylenic, oleic, linoleic, linolenic, ricinoleic or acetylricinoleic acid.

11. A process for the preparation of the composition of matter as defined by claim 1, comprising intimately admixing with said solvent (1) the at least one phosphoric acid ester (I), and at least one amine salt (II) in an amount such that at least one phosphoric acid moiety of a portion of said ester (I) is neutralized with said amine salt, with concomitant liberation of said carboxylic acid (III).

12. The process as defined by claim 11, said at least one phosphoric acid ester (I) and said at least one amine salt (II) being present in amounts such that the ratio:

$$\frac{A \cdot I_{A1}}{B \cdot I_{A2}}$$

is greater than 1, and in which A is the weight of the at least one phosphoric acid ester (I), B is the weight of the at least one amine salt (II), $I_{A1}$ is the acid number of said at least one phosphoric acid ester (I), and $I_{A2}$ is the acid number of said at least one amine salt (II).

13. The process as defined by claim 12, said ratio ranging from about 1.1 to 3.5.

14. A composition of matter comprising (a) at least one phosphoric acid ester of the general formula:

in which Y is a radical of the formula —O—T—(OC$_m$H$_{2m}$)$_r$OH, wherein r is an integer ranging from 2 to 30, m is 2, 3 or 4, and T is a saturated or unsaturated, divalent aliphatic radical, a monocyclic aromatic radical, or an aliphatic-aromatic radical, with each such radical containing up to 40 carbon atoms, and Z is a radical Y or a hydroxyl group, with the proviso that T and r are such that the total number of carbon atoms in the radical Y is more than 20, and (b) at least one amine salt of the general formula:

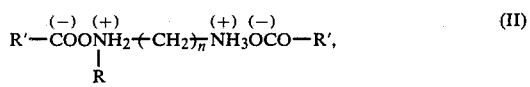

in which R is a saturated or unsaturated, monovalent aliphatic radical containing up to 25 carbon atoms, the symbols R', which can be identical or different, are each an aliphatic radical, an hydroxyl substituted aliphatic radical, or an acyl radical, with each such radical containing from 10 to 30 carbon atoms and comprising at least one ethylenic carbon-carbon double bond, and n is an integer ranging from 1 to 9, said at least one amine salt (b) being present in such amount as will neutralize some, but less than all of the phosphoric acid moieties comprising said at least one phosphoric acid ester (I).

15. A process for the drying of a surface wet with water, comprising treating such surface with the composition of matter as defined by claim 1, thus solubilizing said surface water in said composition.

* * * * *